United States Patent
Floury et al.

(10) Patent No.: US 11,505,411 B2
(45) Date of Patent: Nov. 22, 2022

(54) METHOD OF SORTING BAGGAGE AT AN AIRPORT

(71) Applicant: SOLYSTIC, Bagneux (FR)

(72) Inventors: Alexa Floury, Paris (FR); Hicham Le Bernoussi, Paris (FR); Emmanuel Piegay, Paris (FR)

(73) Assignee: SOLYSTIC, Bagneux (FR)

( * ) Notice: Subject to any disclaimer, the term of this patent is extended or adjusted under 35 U.S.C. 154(b) by 720 days.

(21) Appl. No.: 16/420,381

(22) Filed: May 23, 2019

(65) Prior Publication Data
US 2019/0359429 A1 Nov. 28, 2019

(30) Foreign Application Priority Data

May 24, 2018 (FR) ...................................... 1870600

(51) Int. Cl.
*B65G 43/08* (2006.01)
*B64F 1/36* (2017.01)
(Continued)

(52) U.S. Cl.
CPC .............. *B65G 43/08* (2013.01); *B64F 1/368* (2013.01); *B65G 47/49* (2013.01); *G06T 7/0004* (2013.01);
(Continued)

(58) Field of Classification Search
CPC combination set(s) only.
See application file for complete search history.

(56) References Cited

U.S. PATENT DOCUMENTS 4,058,217 A * 11/1977 Vaughan ............... G06T 11/001
   209/559
5,225,990 A * 7/1993 Bunce .................... G06Q 10/02
   705/13
(Continued)

FOREIGN PATENT DOCUMENTS

DE      202015006102 U1    11/2015
EP         2991900 A1       3/2016
(Continued)

OTHER PUBLICATIONS

Siemens Operational Manual Baggage Vision System BVS; Siemens Postal, Parcel & Airport Logistics GmbH; Nov. 10, 2015; p. 6-7.

(Continued)

*Primary Examiner* — Kyle O Logan
(74) *Attorney, Agent, or Firm* — Ware, Fressola, Maguire & Barber LLP

(57) ABSTRACT

A method of sorting baggage at an airport, the method comprising: acquiring a digital image of an identification label for identifying a piece of baggage, the label including an identification code designed to correspond to a set of items of data from a first database compiled as the baggage is being checked in; the method further comprising the following steps: retrieving information that is printed on the label from the image; comparing the information with data that is recorded in a local second database at the airport before the label is printed, the second database being distinct from the first database, the data from the second database being representative of a list of flights to or from the airport; and, in response to a match being detected, transmitting data representative of a flight number corresponding to the piece of baggage to a conveyor system.

7 Claims, 3 Drawing Sheets

(51) Int. Cl.
  *B65G 47/49* (2006.01)
  *G06T 7/00* (2017.01)
  *G06V 30/148* (2022.01)
  *G06V 30/10* (2022.01)

(52) U.S. Cl.
  CPC .... *G06V 30/153* (2022.01); *B65G 2201/0264* (2013.01); *B65G 2811/0673* (2013.01); *G06V 30/10* (2022.01)

(56) References Cited

U.S. PATENT DOCUMENTS

| | | |
|---|---|---|
| 6,003,009 A | 12/1999 | Nishimura |
| 2006/0273167 A1 | 12/2006 | Baldassari et al. |
| 2017/0057664 A1* | 3/2017 | Soudbakhsh ........... B64F 1/368 |

FOREIGN PATENT DOCUMENTS

| | | |
|---|---|---|
| EP | 3301624 A1 | 4/2018 |
| EP | 3 205 411 B1 | 8/2020 |
| WO | 97/11790 | 4/1997 |
| WO | 2010/067132 A2 | 6/2010 |
| WO | 2017/137106 A1 | 8/2017 |
| WO | 2017/148550 A1 | 9/2017 |

OTHER PUBLICATIONS

Beumer Group A/S, "Video Coding at Copenhagen Airport"; Baglog; vol. 11; Mar. 2016; whole document.
Beumer Group; "Baggage Handling Systems: Remote Encoding by VCS"; Apr. 26, 2017; whole document.
Boye, Magnus; "Kastrup Shaves Precious Minutes Off Its Luggage Handling with Google's TensorFlow"; Aug. 25, 2017; whole document.
Passenger Terminal World Showcase 2017; passengerterminaltoday. com; "Transfer Trends"; whole document.
Passenger Terminal World Showcase 2016; passengerterminaltoday. com; "Effective Handling"; whole document.
Copenhagen Airport Videocoding Functional Design Specification; CPH Videocoding specification; Dec. 16, 2015; pp. 1-13.
Conference programme from EXPO in Cologne where the Video Coding Solution from CPH was presented; Mar. 15-17, 2016; whole document.
International Air Transport Association; "IATA Passenger Services Conference Resolutions Manual, Part 1 and Part 2"; Montreal-Geneva; International Air Transport Association; 2013-2014; 33rd Edition (9156-33); ISBN: 978-92-9252-130-1; whole document.

* cited by examiner

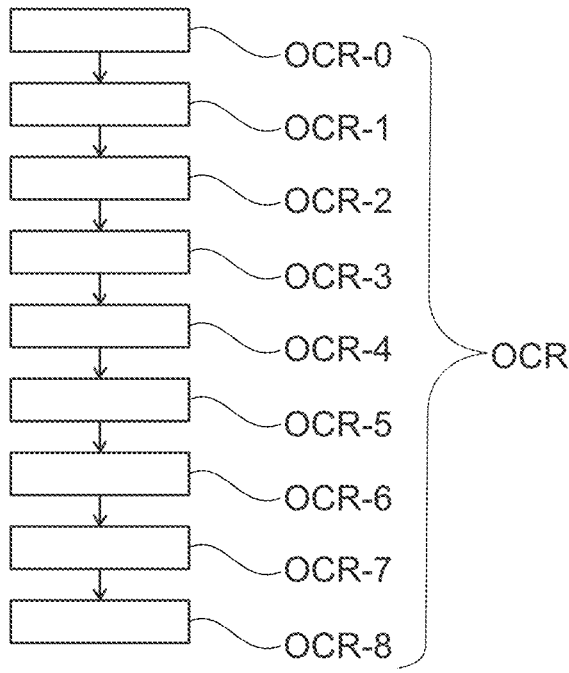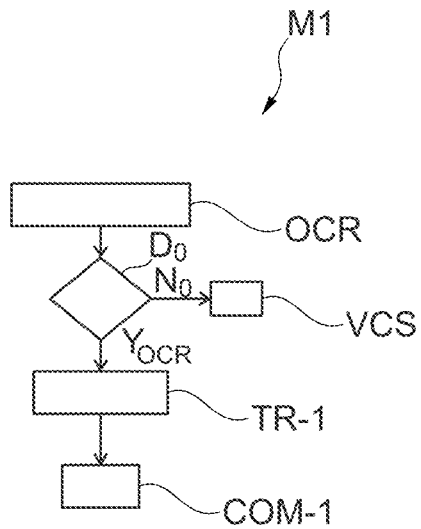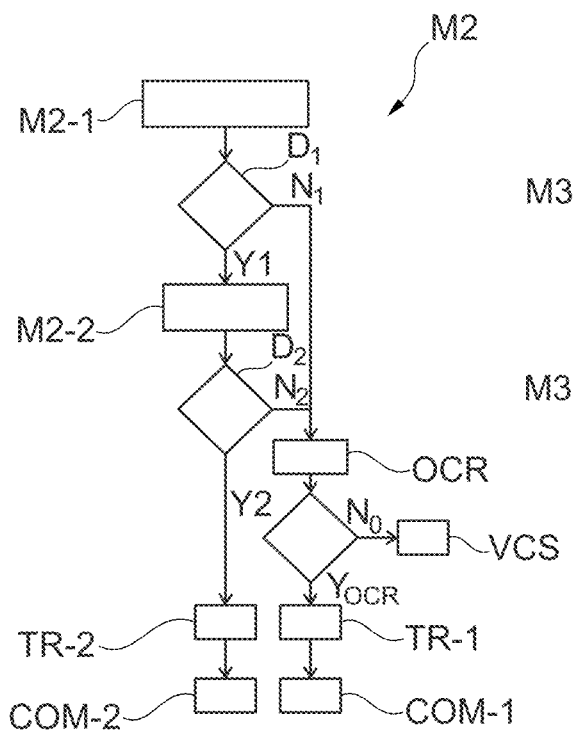
Fig. 2A
Fig. 2B
Fig. 2C
Fig. 2D

| B(1) | D1(1); D2(1); D3(1)... |
| --- | --- |
| B(2) | D1(2); D2(2); D3(2)... |
| ⋮ | ⋮ |
| B(j) | D1(j); D2(j); D3(j)... |
| ⋮ | ⋮ |
| B(x) | D1(x); D2(x); D3(x)... |

| E(1) | T(1); C(1); I(1)... |
| --- | --- |
| E(2) | T(2); C(2); I(2)... |
| ⋮ | ⋮ |
| E(i) | T(i); C(i); I(i)... |
| ⋮ | ⋮ |
| E(n) | T(n); C(n); I(n)... |

| E(1) | CP(1) |
| --- | --- |
| E(2) | CP(2) |
| ⋮ | ⋮ |
| E(m) | CP(m) |
| ⋮ | ⋮ |
| E(n) | CP(n) |

METHOD OF SORTING BAGGAGE AT AN AIRPORT

CROSS REFERENCE TO RELATED APPLICATIONS

This application claims priority under 35 USC § 119 to French Patent Application No. 1870600 filed on May 24, 2018, which application is hereby incorporated by reference in its entirety.

TECHNICAL FIELD

The invention relates to a method of sorting baggage at an airport, the method comprising: transporting the baggage by a conveyor system; acquiring a digital image of a label attached to a piece of baggage and printed out to identify said piece of baggage, and, based on said image, automatically recognizing a flight so as to control said conveyor system and so as to direct said piece of baggage at the airport.

PRIOR ART

A method of that type is disclosed in Patent Application WO 2017/137106.

In the method disclosed in that patent application, each piece of baggage is provided with an identification label bearing lines of textual information and a bar code, which bar code makes it possible to associate each piece of baggage with a set of items of data recorded in a baggage database that is compiled as the baggage is being checked in at a departure airport.

The recorded data may represent a passenger name, a boarding number, a flight number, departure, arrival or, where applicable, transit airport codes, or indeed a flight plan.

Thus, reading the bar code makes it possible to identify and to direct a piece of baggage in an automated conveyor system at the departure airport, and at the arrival airport, or, where applicable, at a transit airport, the relevant information from the database being transmitted to the airports in question.

In the event of difficulty in reading the bar code, e.g. in the event the label is soiled or damaged, Patent Application WO 2017/137106 suggests basing identification of the piece of baggage on the textual information by means of analyzing the label by optical character recognition (OCR), including comparing the recognized textual elements with the data recorded in the baggage database, for the purpose of avoiding having to use a human operative, which is a source of loss of efficiency and of additional cost.

Conversely, that patent application does not solve the baggage sorting problems due to missing data in the database, to interruption in access to the database, or to a delay in transmitting its data.

In such situations, there is no solution other than to perform manual sorting, which is an operation that is extremely costly and that can give rise to significant delays, when, for example, the baggage data for an entire flight is not available at the time that flight arrives at an airport.

SUMMARY OF THE INVENTION

To this end, the invention provides a method of sorting baggage at an airport, the method comprising: transporting the baggage by a conveyor system; and acquiring at least one digital image of a label that is attached to a piece of baggage and that was printed out to identify said piece of baggage unambiguously, the label including a machine-readable identification code designed to correspond to a set of items of data from a baggage first database compiled as the baggage is being checked in; the method further comprising attempting to identify the piece of baggage by reading said identification code; and, based on said image, automatically recognizing a flight corresponding to said piece of baggage so as to control said conveyor system and so as to direct the piece of baggage at the airport; the method further comprising the following steps: retrieving textual information that is printed on the label from said digital image; comparing said textual information with data that is recorded in a local second database at the airport before the label for identifying said piece of baggage is printed, said second database being distinct from said baggage first database, the data from the second database being representative of a list of flights to or from said airport with a view to detecting a match; and, in response to a match being detected, automatically transmitting data representative of a flight number corresponding to the piece of baggage to the conveyor system.

In this manner the sorting of a piece of baggage at an airport can be based on associating said piece of baggage with a given flight on the basis of information from a local database that is easily accessible and easy to make exhaustive.

The method of the invention may advantageously have the following features:
- in automatically recognizing the flight, the method may further comprise: detecting and identifying a line of the largest characters present on the label; isolating a region of the label that includes said line; detecting another line of characters situated within that region; and applying an optical character recognition (OCR) operation to said line;
- the method may further comprise comparing the textual information retrieved from the digital image with the data from said set of items of data from the baggage database so as to detect a match or a non-match between said textual information and said items of data;
- in the event a non-match is detected, the method may further comprise transmitting data representative of non-read information to the automatic sorting unit so as to control the conveyor unit;
- the method may further comprise a detection step for detecting failure to decipher said machine-readable identification code during the attempt to identify the baggage by reading said identification code, and, in response to such detection, the textual information retrieved from the digital images may be used by the conveyor system for sorting the baggage;
- the method may further comprise a detection step for detecting failure to associate said identification code as deciphered with the set of items of data from the baggage database in the event of absence of corresponding data in said database, and, in response to such detection, the textual information retrieved from the digital images is used by the conveyor system to sort the baggage; and
- it may further comprise a detection step for detecting failure to associate said identification code as deciphered with the set of items of data from the baggage database in the event it is impossible to connect to said baggage database, and, in response to such detection, the textual information retrieved from the digital images is used by the conveyor system to sort the baggage.

Thus, the sorting of the baggage may be based on textual information that is recognized on the label by comparing it with data from a flights database that is prepared in advance, it being possible for said recognized data to replace or to be combined with information stored in a baggage database that is constantly refreshed and that is possibly remote from the airport where the baggage is to be found, that baggage database therefore being potentially problematic to access and to make exhaustive, such comparison making identifying a piece of baggage and/or automatically sorting it more reliable.

BRIEF DESCRIPTION OF THE DRAWINGS

The present invention can be better understood and other advantages appear on reading the following detailed description of an implementation given by way of non-limiting example and with reference to the accompanying drawings, in which:

FIG. 2A shows a baggage sorting method, and FIGS. 2B, 2C, and 2D respectively show first, second, and third sorting modes.

DESCRIPTION OF AN IMPLEMENTATION

Figure 1A:
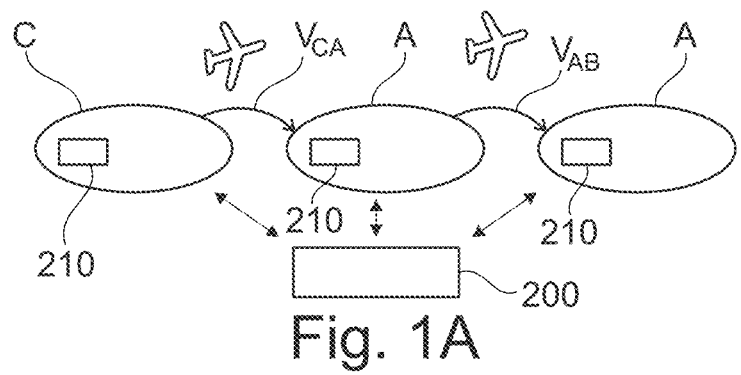
FIG. 1A shows airports and associated databases.
Figures 1B, 1C:
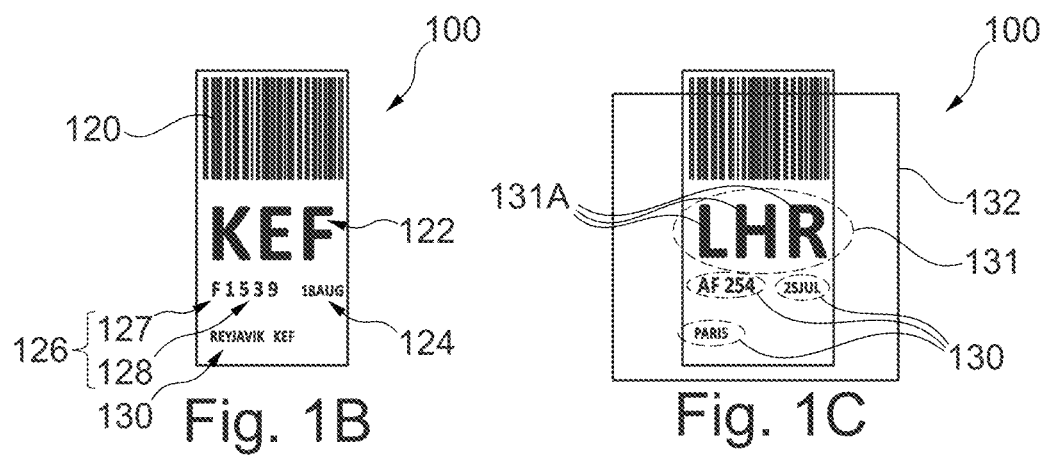
FIGS. 1B and 1C show baggage labels.

A method of the invention for sorting baggage at an airport is shown by FIGS. 1A to 3D.

During a journey by air from an airport A to an airport B, or from an airport C to airport A, such journeys being referenced respectively $V_{AB}$ and $V_{CA}$, each piece of baggage 110 transported is identified by means of a label 100 printed out at the time the corresponding baggage is checked in, and including an identification code such as a bar code 120 and textual information of different types that can be useful for tracking the baggage up to its final destination.

The identification code may be a machine-readable identification code, such as a Quick Response (QR) code or a Radiofrequency Identification (RFID) tag or chip, without being restricted to bar codes only.

The information indicated on the label includes at least one International Air Transport Association (IATA) airport code, generally composed of a three-letter acronym 122 corresponding to an airport, and a flight number 126 composed of an encoded name 127 of an airline and of a flight number 128 internal to that airline, but it may also include, for example, a date 124 or a city 130.

A baggage database 200 is dynamic, in that it is compiled as the baggage 110 is being checked in, in such a manner as to store that information, and optionally additional information, in association with the corresponding bar codes, and is shared between several airports by means of a computer network.

Figures 3A, 3B, 3C, 3D:
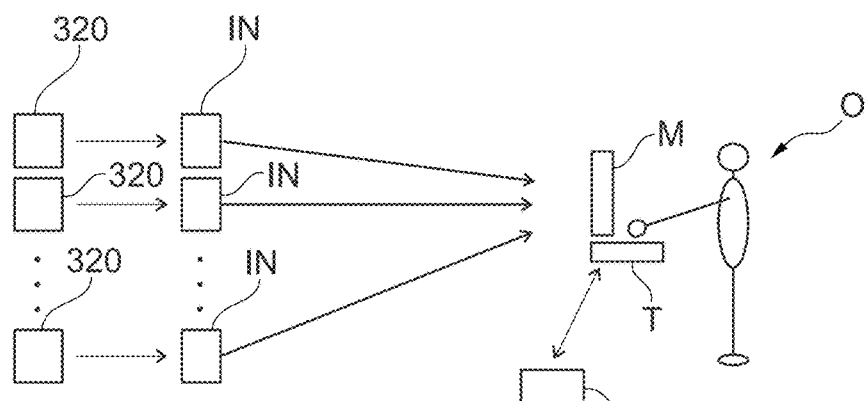
FIGS. 3A, 3B, and 3C respectively show a baggage database, a flights database, and a correspondence table.
FIG. 3D shows a method of sorting by video coding.

Thus, a baggage database 200 may be constituted by sets B(j) of data items Dk(j) of different types k (owner, IATA code, flight number, date, etc.), each data set corresponding to a piece of baggage (j), as shown by FIG. 3A, and the function of the baggage database is to identify, track, and sort the baggage throughout its journey.

In addition, a flights database 210 is compiled for each airport, listing the flights to and from the corresponding airport during a given period of activity, e.g. one day or two or more consecutive days of activity at the airport, including, in particular, the day on which a piece of baggage is processed in accordance with the invention.

These flights databases 210 are constituted by sets E(i) of data items, each data set corresponding to a respective flight (i), the data including at least one airport three-letter acronym (IATA code for the destination airport) T(i), and a flight number composed of an encoded airline name C(i), and of a flight number I(i) internal to the airline, as shown by FIG. 3B.

The flights databases can be prepared well in advance, before the start of a given period of activity of the corresponding airport, and before the baggage taken on board the listed flights is checked in, and said flights databases are not intended to be modified during that period; they can therefore be considered to be static, at least during a given period of activity, in particular compared with dynamic baggage databases that are refreshed as the baggage is being checked in or at the end of checking in of the baggage for a given flight, including during the period of activity of the airport.

In addition, said flights databases may be located at and specific to the airport in question, rather than being remote and requiring long-distance connections.

Thus, flights databases imply better stability and can be known much further in advance than a baggage database, and using them therefore makes it possible to achieve much greater operational reliability than using baggage databases.

Figure 1D:
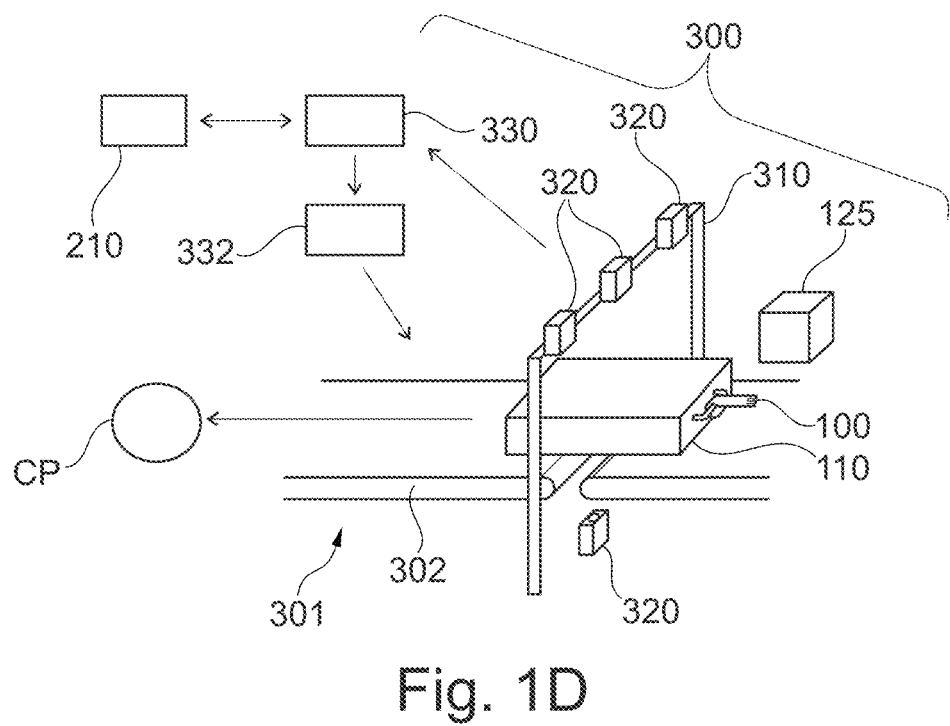
FIG. 1D shows a sorting system.

In this implementation of the method that is shown in FIG. 1D, baggage 110 at a given airport is conveyed by a conveyor system 301, in which an automatic sorting unit 332 controls a conveyor unit 302, such as a set of conveyor belts, which unit causes the baggage to go through or past an automatic identification system 300 comprising a reader device 125 for reading the bar codes 120 borne by the labels 100 with a view to sorting as a function of the data Dk(j) associated with said bar codes in the baggage database 200, the reader device 125 being connected to the baggage database 200.

The automatic identification system 300 further comprises a gate-forming gantry 310 equipped with a plurality of cameras 320 arranged to acquire digital images of the baggage as seen from different angles, in order to maximize the chances of having usable images of the labels 100.

In a baggage sorting method that is shown in FIG. 2A, a piece of baggage is brought under the gantry, so that at least one digital image is taken of the label attached to said piece of baggage during a preliminary stage OCR-0 of OCR software analysis performed on the label, and referred to as "OCR analysis".

The automatic identification system 300 further comprises a computer processor unit 330 that is connected to the automatic sorting unit 332, to the reader device 125, and to the flights database 210 of the given airport, and that submits said digital image to OCR analysis in such a manner as to identify on it textual information or lines of text present in the form of lines 130 and 131 of alphanumeric characters, and in such a manner as to compare them automatically with the data T(i), C(i), and I(i) of the data sets E(i) in said flights database 210, in order to detect a match between the textual information and said data.

Identifying relevant lines of characters, i.e. lines of characters that correspond potentially to the data in the flights database, advantageously uses the fact that, by convention, the characters of the airport three-letter acronym 122 are the largest on a baggage label 100.

Thus, as shown in FIG. 2A, OCR of the lines of characters may comprise the following in the following order: single or multiple binarizing OCR-1 the digital image; determining OCR-2 clusters 131A of pixels in the binarized image that have the same color and an expected size for characters of an airport three-letter acronym 122 that corresponds to a line of the largest characters present in the image of the label; calculating OCR-3 a neighborhood graph of said clusters 131A; determining OCR-4 whether a line 131 of alphanumeric characters forms a triplet of neighboring clusters on the basis of said neighborhood graph, it being possible that said triplet of clusters might plausibly correspond to an airport three-letter acronym 122; determining and extracting OCR-5 a region of interest 132 in the image that is substantially centered on said triplet of clusters 131; deskewing and binarizing OCR-6 said region of interest in the image; locating OCR-7 lines of text 130 in the vicinity of said triplet of clusters in said region of interest of the deskewed image; and an operation OCR-8 of analyzing the characters of said triplet of clusters and/or said lines of text, during which operation hypotheses are produced about the textual information of the lines of text 130 and 131, and said hypotheses are checked by comparing them with the data T(i), C(i), and I(i) of the flights database 210 of the airport.

In a first mode M1, shown in FIG. 2B, in response to detecting a match $Y_{OCR}$ between the hypotheses of the OCR analysis and at least one of the items of data T(i), C(i) and I(i) of one of the data sets E(i) of the database during a step Do of detecting a match or a non-match of the hypotheses, the computer processor unit transmits TR-1 data representative of a flight corresponding to the piece of baggage, such as a corresponding flight number 126, to the automatic sorting unit 332 that then, during a step COM-1, controls the conveyor unit 302 on the basis of information obtained by said OCR analysis in steps OCR-0 to OCR-8 and/or on the basis of the data from said data set E(i) that matches the textual information of the label that is retrieved from the digital images, in such a manner as to perform sorting by routing the baggage to a collection point CP.

By way of example, the sorting performed by the automatic sorting unit 332 may be performed by a means of an assignment table 220 that assigns a baggage collection point CP(m) to each flight (m) and thus to each data set E(m) from the flights database 210 as shown in FIG. 3C.

By way of example, the collection points may be a conveyor inlet, a boarding gate, or a baggage carousel.

In the first mode M1, the sorting is based entirely on the information obtained by means of the OCR analysis, and thus on the flights data stored in a flights database, and the OCR analysis may represent an independent solution on which to base sorting the baggage.

A second mode M2, shown in FIG. 2C, differs from the first mode M1 in that OCR analysis for recognizing data from a flight corresponding to the piece of baggage and for transmitting TR-1 to the conveyor system is used only in the event of failure $N_1$ to decipher M2-1 the bar code, such failure being detected during a detection step $D_1$ for detecting success or failure to decipher the bar code, e.g. in the event the bar code is damaged and illegible, or in the event of failure $N_2$ to associate M2-2 the deciphered code with a data set B(j) from the baggage database 200 during a detection step $D_2$ for detecting success or failure to associate, e.g. in the event of it being impossible to connect to the baggage database or of there not being any relevant data in that database.

In mode M2, in the event Y1 of successfully deciphering the bar code and then Y2 of successfully associating the deciphered code with a data set B(j) from the baggage database 200, the data representative of the baggage is transmitted TR-2 to the automatic sorting system 332 that then, during a step COM-2, controls the conveyor unit 302 as a function of the information in the baggage database data set that is associated with the baggage via its label, so as to proceed to sort the baggage.

In a third mode M3, shown in FIG. 2D, a bar code of the label of a piece of baggage is read M3-1 and the OCR analysis described above is performed on the same label, and then the data obtained by implementing the two methods are compared M3-2, in such a manner as to cross-check the data obtained by implementing both methods, thereby increasing the reliability of baggage sorting.

In the event $Y_{COMP}$ a match is detected between the data obtained by both methods during a detection step $D_3$ for detecting a match or a non-match between the data, data representative of the baggage is transmitted TR-3 to the automatic sorting unit 332, which then responds by controlling the conveyor unit 302 during a step COM-3 for proceeding to sort the baggage.

In the event $N_3$ of detecting a non-match between the data obtained by the two methods during the detection step $D_3$, data representative of non-read information is transmitted TR-4 to the automatic sorting unit 332, which then responds by controlling the conveyor unit 302 to cause the piece of baggage to undergo special handling during a step E by removing it from the automatic sorting system, e.g. by bringing it to a predetermined outlet and/or by applying a video coding operation or sorting it entirely manually, in order to increase the reliability of the sorting.

For each of the modes M1, M2, and M3, in the event that it is impossible to achieve a sufficient degree of certainty for the sorting, e.g. in the event No that it is impossible to detect a match between the hypotheses produced during the OCR analysis and the data from the flights database during the match detection step Do, or in the event N3 of a non-match being detected between the data obtained by reading M3-1 a bar code and the data obtained by the OCR analysis during the match detection step $D_3$, it is possible to use a video coding system (VCS) procedure in which digital images IN of said piece of baggage that are acquired by the cameras 320 are presented to a human operative O by means of a monitor M, which operative then manually searches for a match between textual information that is visible in said images and said data from the flights database 210 by means of a computer terminal T connected to said flights database, as shown in FIG. 3D.

Naturally, the present invention is in no way limited to the above-described implementation, which can undergo modifications without going beyond the ambit of the invention.

The invention claimed is:

1. A method of sorting baggage at an airport, the method comprising:
    transporting the baggage by a conveyor system;
    acquiring at least one digital image of a label that is attached to a piece of baggage and that was printed out to identify said piece of baggage unambiguously, the label including a machine-readable identification code designed to correspond to a set of items of data from a baggage first database compiled as the baggage is being checked in;
    attempting to identify the piece of baggage by reading said identification code; and, based on said image, automatically recognizing a flight corresponding to said piece of baggage so as to control said conveyor system and so as to direct said piece of baggage at the airport; said method further comprising:

retrieving textual information that is printed on the label from said digital image;

comparing said textual information with data that is recorded in a local second database at the airport before the label for identifying said piece of baggage is printed, said second database being distinct from said baggage first database the data from the second database being representative of a list of flights to or from said airport with a view to detecting a match; and, in response to a match being detected, automatically transmitting data representative of a flight number corresponding to the piece of baggage to the conveyor system.

2. The method according to claim 1, wherein in automatically recognizing the flight, the method further comprises:

detecting and identifying a line of the largest characters present on the label;

isolating a region of the label that includes said line;

detecting another line of characters situated within that region; and applying an optical character recognition operation to said line.

3. The method according to claim 1, further comprising:

comparing the textual information retrieved from the digital image with the data from said set of items of data from the baggage first database so as to detect a match or a non-match between said textual information and said items of data.

4. The method according to claim 3, wherein in the event a non-match is detected, the method further comprises transmitting data representative of non-read information to the automatic sorting unit so as to control the conveyor unit.

5. The method according to claim 1, further comprising:

a detection step for detecting failure to decipher said machine-readable identification code during the attempt to identify the baggage by reading said identification code, and in that, in response to such detection, the textual information retrieved from the digital images is used by the conveyor system for sorting the baggage.

6. The method according to claim 1, further comprising:

a detection step for detecting failure to associate said identification code as deciphered with the set of items of data from the baggage first database in the event of absence of corresponding data in said first database, and in that, in response to such detection, the textual information retrieved from the digital images is used by the conveyor system to sort the baggage.

7. The method according to claim 1, further comprising:

a detection step for detecting failure to associate said identification code as deciphered with the set of items of data from the baggage first database in the event it is impossible to connect to said first database, and in that, in response to such detection, the textual information retrieved from the digital images is used by the conveyor system to sort the baggage.

* * * * *